United States Patent
Sugiyama (10) Patent No.: US 6,736,716 B1
(45) Date of Patent: May 18, 2004

(54) SHELL PROCESSING METHOD AND SHELL PROCESSING DEVICE USED IN THE METHOD

(75) Inventor: Hiroaki Sugiyama, Mutsu (JP)

(73) Assignee: Mutsu Kaden Tokki Co., Ltd., Mutsu (JP)

( * ) Notice: Subject to any disclaimer, the term of this patent is extended or adjusted under 35 U.S.C. 154(b) by 37 days.

(21) Appl. No.: 09/787,425

(22) PCT Filed: Jul. 21, 2000

(86) PCT No.: PCT/JP00/04900

§ 371 (c)(1),
(2), (4) Date: Jun. 18, 2001

(87) PCT Pub. No.: WO01/06861

PCT Pub. Date: Feb. 1, 2001

(30) Foreign Application Priority Data

Jul. 23, 1999 (JP) .......................................... 11/209996
Oct. 6, 1999 (JP) .......................................... 11/286101

(51) Int. Cl.[7] .............................................. A22C 29/02
(52) U.S. Cl. .......................................................... 452/2
(58) Field of Search ............................... 452/1, 2, 7, 8, 452/10, 18, 20

(56) References Cited

U.S. PATENT DOCUMENTS

| | | | |
|---|---|---|---|
| 3,755,855 A | | 9/1973 | Ouw et al. |
| 4,008,508 A | * | 2/1977 | LaPine et al. ................. 452/3 |
| 4,692,965 A | * | 9/1987 | Stephenson ................... 452/4 |
| 5,178,577 A | | 1/1993 | Kirk |
| 5,195,921 A | * | 3/1993 | Ledet ............................ 452/4 |
| 6,485,363 B2 | * | 11/2002 | Keith ............................ 452/3 |

FOREIGN PATENT DOCUMENTS

| | | | |
|---|---|---|---|
| DK | WO 9105478 | * | 5/1991 |
| JP | 63-258530 | | 10/1988 |
| JP | 3-232449 | | 10/1991 |
| JP | WO 97/00616 | | 1/1997 |
| JP | 9-74993 | | 3/1997 |
| JP | 9-172947 | | 7/1997 |
| NL | WO 9414327 | * | 7/1994 |

* cited by examiner

*Primary Examiner*—Charles T. Jordan
*Assistant Examiner*—Judith A. Nelson
(74) *Attorney, Agent, or Firm*—Oblon, Spivak, McClelland, Maier & Neustadt, P.C.

(57) ABSTRACT

In a shellfish processing method, meat is separated from shells by injecting liquid into inside of the shells of the shellfish, thereby opening the shell. After one of the shells is opened, associated parts of the shellfish are suckingly removed independently or collectively in part or in total. An opening portion is formed in a part of a shell of the shellfish and associated parts of the shellfish are suckingly removed through the opening portion independently or collectively in part or in total. After the associated parts are suckingly removed, the meat is separated from the other shell by injecting liquid in the shellfish. The opening portion is formed in a part of the shell by removing a part of the shell by a cutting operation or by perforating a part of the shell or by breaking a part of the shell by pressurization. Fragments and powder of the shell produced when the opening portion is formed in the shell is removed by suction or liquid washing. The opening portion(s) is formed in one or both of the shells. A shellfish processing device comprises an associated part removing mechanism, a transporting body, an opening mechanism, a first separating mechanism and a second separating mechanism in order to achieve the processing method.

42 Claims, 9 Drawing Sheets

SHELL PROCESSING METHOD AND SHELL PROCESSING DEVICE USED IN THE METHOD

BACKGROUND OF THE INVENTION

1. Field of the Invention

The present invention relates to a shellfish processing method for taking out a muscle adductor of a scallop or meat (including a muscle adductor) or associated parts such as mantle and/or gonad of a shellfish such as an abalone from a shell, and a shellfish processing device used in such a method, for example, which method and device are suitable for automatically taking out the muscle adductor and associated parts from the scallop shell by means of a machine before the muscle adductor of the scallop is forwarded to the market.

2. Related Background Art

The shellfishes such as scallop and abalone have been forwarded to the market in various commodity forms. For example, regarding the scallop, the following commodity forms are known.

1. Raw goods with shells;
2. Raw goods in which one of shells is opened and removed and the associated parts such as midgut gland, muscle adductor, gonad and mantle are remained on the other shell;
3. Raw goods including only associated parts such as midgut gland, gonad, mantle, heart, gill and tentacle;
4. Goods including only raw muscle adductor;
5. Goods including only raw gonad (however, there is gonad only in the breeding season); and
6. Goods including raw mantle and gill.

In the goods other than the goods with the shells forwarded to the market, the gonad, mantle, muscle adductor and the like must be taken out or removed from the shells. If the removing operation is performed manually, since great labor and time are required, methods for automatically opening the shellfish and taking out the muscle adductor have been developed in order to perform the removing operation efficiently for a short time. One of such methods is a muscle adductor taking-out method shown in FIGS. 10A to 10D. Such a method is carried out as follows.

(1) An operator sets one scallop 90 horizontally on each working table attached to a belt conveyor. In this case, the scallop is set in such a manner that, among two shells 91, 92 of the scallop 90, a shell (having a shallow curvature and brown color; normally called as a right shell) 91 called as an upper shell is located downwardly.

Figure 10A:
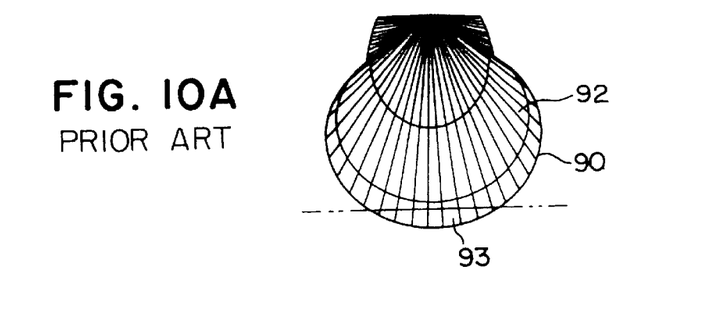
FIGS. 10A to 10D are explanatory views showing a conventional muscle adductor taking-out method.
Figure 10B:
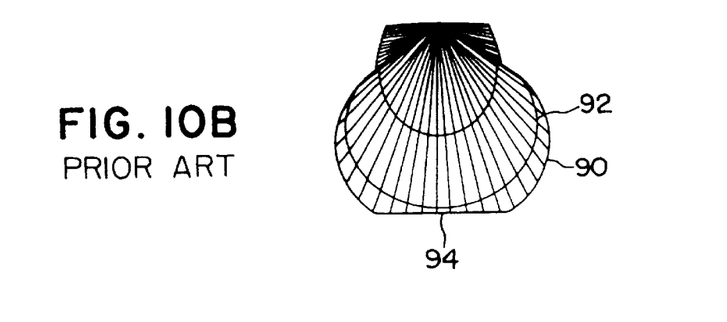
Figure 10C:
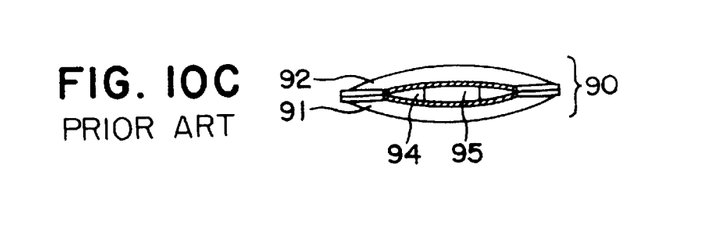

(2) Leading end portions 93 of two shells 91, 92 of the scallop 90 being conveyed by the belt conveyor is cut by a diamond cutter along a phantom line in FIG. 10A to remove the leading ends as shown in FIG. 10B, thereby forming an opening portion 94 between the shells 91, 92 as shown in FIG. 10C. During the cutting operation, cold water is applied to the diamond cutter to prevent the shells 91, 92 from being heated and to lengthen the service life of the cutter and to prevent cut powder from being scattered. Incidentally, if the shells 91, 92 are heated, the heat will be transmitted to the muscle adductor 95 within the shells, thereby worsening freshness and quality of the muscle adductor 95.

Figure 10D:
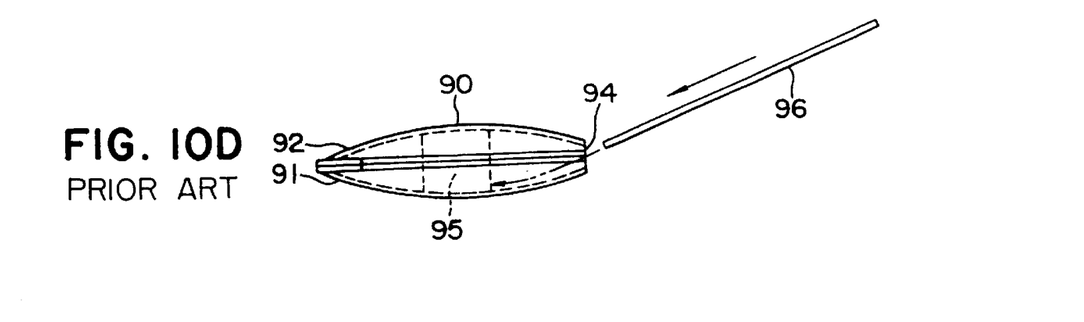

(3) As shown in FIG. 10D, a separating tool 96 such as a spatula is inserted into the scallop 90 through the opening portion 94 along an inner surface of one shell 91 to separate the shell 91 from the muscle adductor 95. The scallop 90 in which the shell 91 was separated is sent outside from the working table.

(4) Parts other than the muscle adductor 95 such as midgut gland, heart, mantle and gonad (referred to generically as "associated parts" hereinafter) attached to the other shell (having a deep curvature and white color; normally called as a left shell) 92 of the scallop 90 sent are removed manually.

(5) The separating tool 96 is pushed along an inner surface of the shell 92 to separate the other side of the muscle adductor 95 from the shell 92 and take out the muscle adductor 95.

Although the above-mentioned muscle adductor taking-out method can facilitate the entire operation and make it efficient more than the manual operation, since the muscle adductor is separated from the shells by inserting the separating tool, the muscle adductor may be scratched, broken or torn, thereby worsening the quality and grade of the muscle adductor. Thus, it is difficult to surely take out the muscle adductor without waste.

SUMMARY OF THE INVENTION

An object of the present invention is to provide a shellfish processing method and device, in which meat (including a muscle adductor) of a shellfish is hard to be scratched, the muscle adductor is hard to be broken or torn and can be taken out easily and perfectly without damaging the muscle adductor, a processing operation can be performed sanitarily, and the muscle adductor, mantle, gonad and the like can be taken out in accordance with a desired commodity form.

According to an aspect of the present invention, the shellfish processing method comprises a shell opening method in which meat is separated from shells by injecting liquid into inside of the shells of the shellfish.

According to another aspect of the present invention, the shellfish processing method comprises a shell opening method in which an opening portion is formed in a part of shells of the shellfish and meat is separated from the shells by injecting liquid into inside of the shells through the opening portion.

According to further aspect of the present invention, the shellfish processing method comprises a shell opening method in which, after one of shells is opened, meat is separated from the shells by injecting liquid into inside of the shells.

According to further aspect of the present invention, the shellfish processing method comprises a suckingly removing method in which, after one of shells is opened, associated parts such as midgut gland, gonad, mantle, heart, gill and tentacle of a shellfish is removed independently or collectively in part or in total by suction.

According to further aspect of the present invention, the shellfish processing method comprises a suckingly removing method in which an opening portion is formed in a part of shells of the shellfish and associated parts such as midgut gland, gonad, mantle, heart, gill and tentacle of a shellfish is removed through the opening portion independently or collectively in part or in total by suction.

According to further aspect of the present invention, the shellfish processing method comprises a separating method in which an opening portion is formed in a part of shells of the shellfish and associated parts such as midgut gland, gonad, mantle, heart, gill and tentacle of a shellfish is removed through the opening portion independently or collectively in part or in total by suction, and, thereafter, meat is separated from the other shell by injecting liquid in the shellfish.

According to further aspect of the present invention, in the above-mentioned shellfish processing method, there is provided a method in which an opening portion is formed in one or both of two shells by removing a part of the shell or shells by a cutting operation or by perforating a part of the shell or shells or by breaking a part of the shell or shells by pressurization.

According to further aspect of the present invention, in the above-mentioned shellfish processing method, there is provided a method in which small fragments and powder of the shell produced when the opening portion is formed in the shells is removed by suction or liquid washing.

According to further aspect of the present invention, the shellfish processing device includes an associated part removing mechanism for suckingly removing associated parts such as midgut gland, heart, mantle and the like independently or collectively in part or in total from a shellfish in which one of shells is opened.

According to further aspect of the present invention, the shellfish processing device includes a transporting body for transporting a shellfish, an opening mechanism for forming an opening portion in a part of shells of the shellfish transported by the transporting body, and an associated part removing mechanism for suckingly removing associated parts such as midgut gland, heart, mantle and the like of the shellfish independently or collectively in part or in total through the opening portion.

According to further aspect of the present invention, in the above-mentioned shellfish processing device, there is provided a first separating mechanism for separating meat of the shellfish from a shell by injecting liquid into the inside of one of the shells.

According to further aspect of the present invention, in the above-mentioned shellfish processing device, there is provided a second separating mechanism for separating the meat from the other shell by injecting liquid into the inside of the other shell.

BEST MODE FOR CARRYING OUT THE INVENTION

First Embodiment of Shellfish Processing Method

Figure 1A:
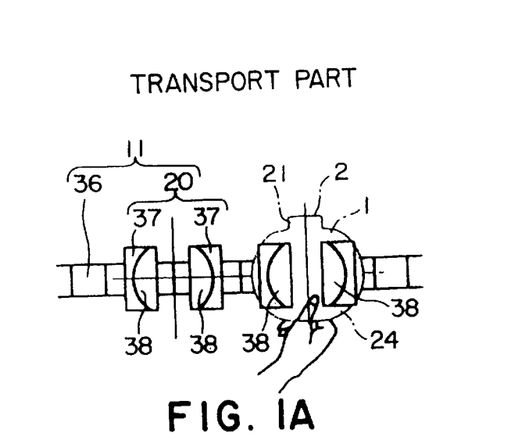
FIGS. 1A to 1E are explanatory views showing steps of a shellfish processing method according to the present invention.

A first embodiment of a muscle adductor and associated parts taking-out method will now be fully explained with reference to FIGS. 1A to 1E. This embodiment relates to a case where a shellfish is a scallop having two shells 2. In this embodiment, as shown in FIG. 1A, the shellfish 1 is transported while being rested on a receiving tray 20 of a transporting body 11. An operation for resting the shellfish 1 on the receiving tray 20 can be performed manually or automatically by a machine. In this case, orientation of the shellfish 1 and upper and lower sides of the shellfish 1 are pre-determined. For example, a connection side 21 (FIG. 1A) between two shells 2 of the shellfish 1 is oriented toward a width-wise direction of the transporting body 11, and, normally, the shellfish may be set in such a manner that a relatively flat shell called as an upper shell (having a brown color; right shell) having a shallow curvature is located downwardly or a shell (having a white color; left shell) having a deep curvature is located downwardly.

Figure 3A:
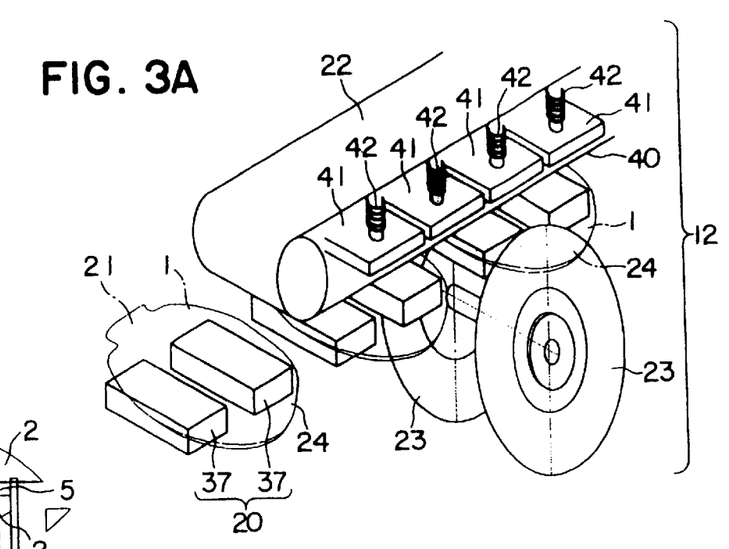
FIG. 3A is an explanatory view showing an opening mechanism used in the shellfish processing method according to the present invention.
Figure 3B:
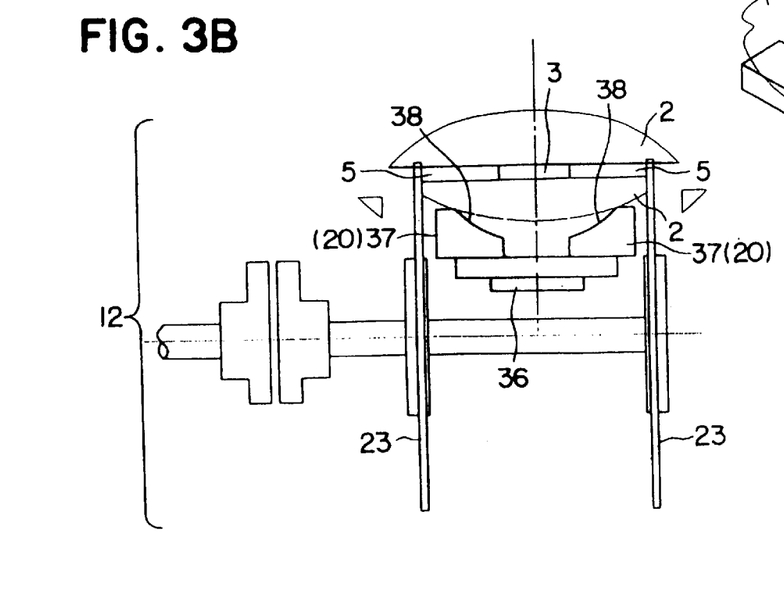
FIG. 3B is a front view of the opening mechanism.

The shellfish 1 rested on the receiving tray 20 is transported by the transporting body 11. When the shellfish is transported to a predetermined position, as shown in FIG. 3A, the shellfish is entered below a holder 22 utilizing a belt conveyor disposed above the transporting body 11 and lies between the holder 22 and the receiving tray 20 of the transporting body 11. The transporting body 11 and the holder 22 are moved intermittently and stopped and started in a synchronous manner. When the shellfish 1 is transported above cutter blades 23, the transporting body 11 and the holder 22 are stopped, and, during the stoppage, the connection side 21 and a leading end side 24 of the lower shell 2 are cut and removed by two cutter blades 23, as shown in FIG. 3B, thereby forming opening portions 5. Thereafter, the transporting body 11 and the holder 22 start to be driven synchronously thereby to transport the shellfish 1 on the receiving tray 20. When the shellfish 1 is transported in the vicinity of a first nozzle 25 (FIGS. 1C and 4), the transporting body 11 and the holder 22 are stopped.

Figure 4:
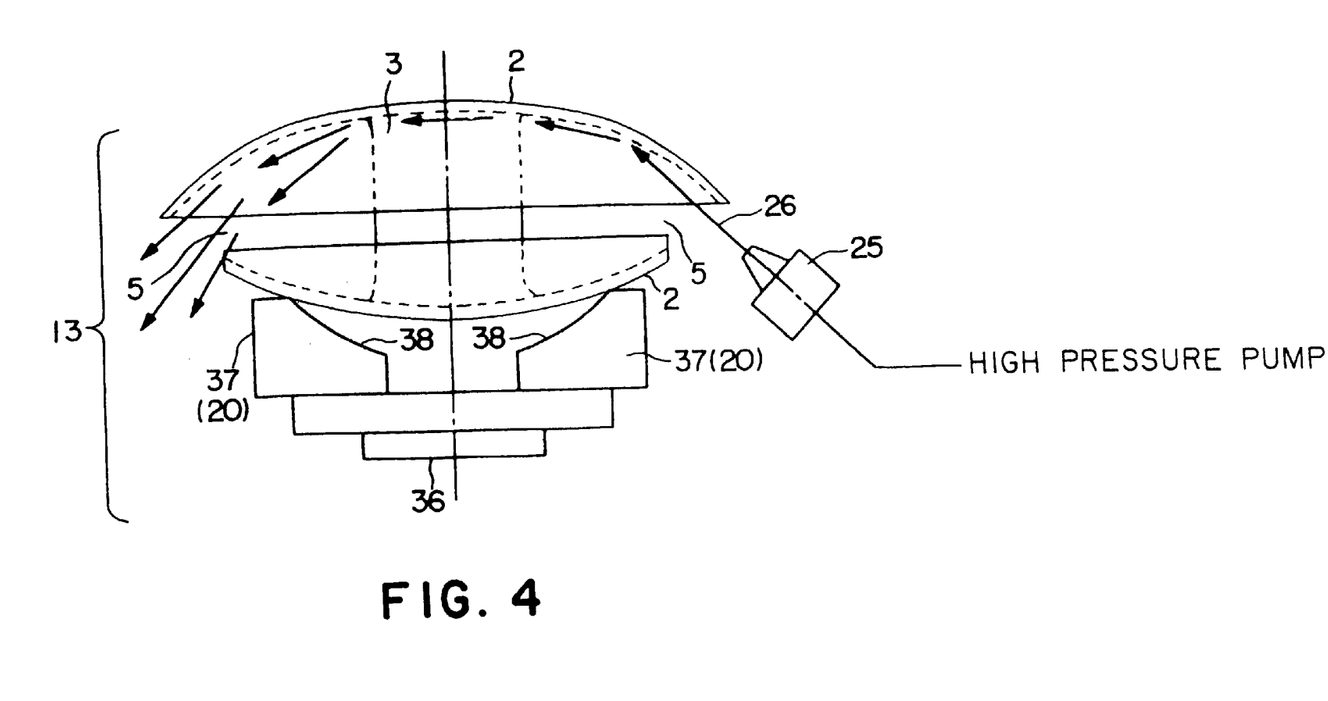
FIG. 4 is an explanatory view showing a first separating mechanism used in the shellfish processing method according to the present invention.

During the stoppage, the shellfish 1 is sucked to and held on the receiving tray 20 by means of a suction device incorporated into the receiving tray 20. In this condition, as shown in FIG. 4, liquid 26 injected with high pressure from the first nozzle 25 is injected through the opening portion 5 of the shell 2 along an inner surface of the upper shell 2 to be directed to an adhesion portion between meat (muscle adductor) 3 and the shell 2, thereby separating the shell 2 from an upper surface of the muscle adductor 3 (i.e., opening the shell). In the illustrated embodiment, while the single nozzle 25 was used, a plurality of nozzles may be arranged along a circumference of the shellfish 1 so that liquids 26 injected from the nozzles are directed to the adhesion portion between the muscle adductor 3 and the shell 2 from multi directions along the inner surface of the shell 2 thereby to separate the muscle adductor 3 from the shell 2 or a single nozzle 25 may be rocked or may be revolved along the circumference of the muscle adductor 3 to direct the liquid 26 injected from the nozzle 25 to the adhesion portion between the muscle adductor 3 and the shell 2 from multi directions along the inner surface of the shell 2 thereby to separate the muscle adductor 3 from the shell 2. The liquid 26 may be water or other liquid. In this case, when the liquid 26 is high pressure fine jet, the muscle adductor 3 can be separated from the shell 2 more easily. After the upper shell 2 is opened, the transporting body 11 is shifted again to transport the shellfish 1. When the shellfish 1 is transported in the vicinity of an, associated part removing mechanism (suction device) 10, the transporting body 11 is stopped again.

Figure 1B:
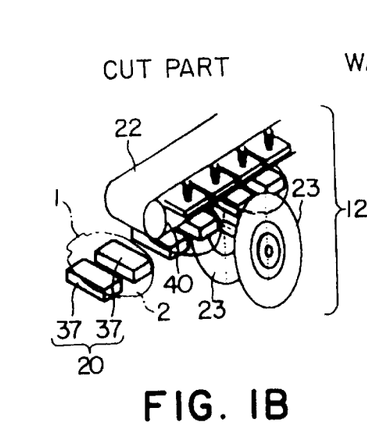
Figure 1C:
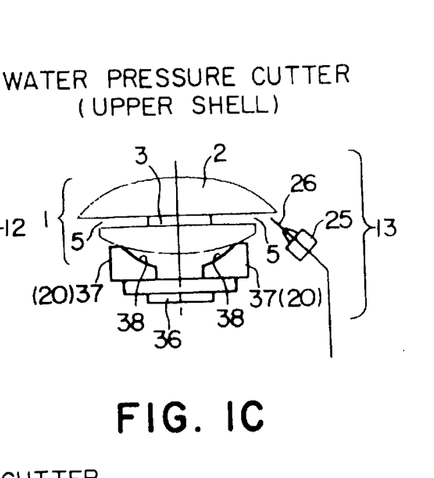
Figure 1D:
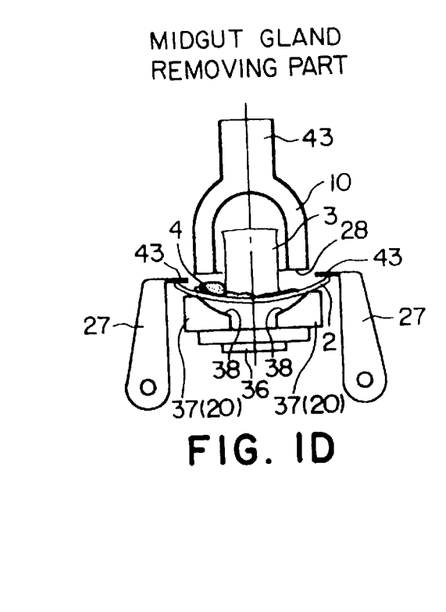
Figure 1E:
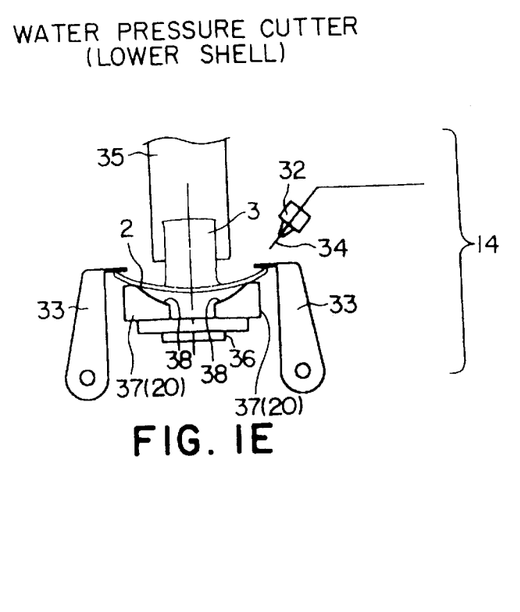
Figure 2A:
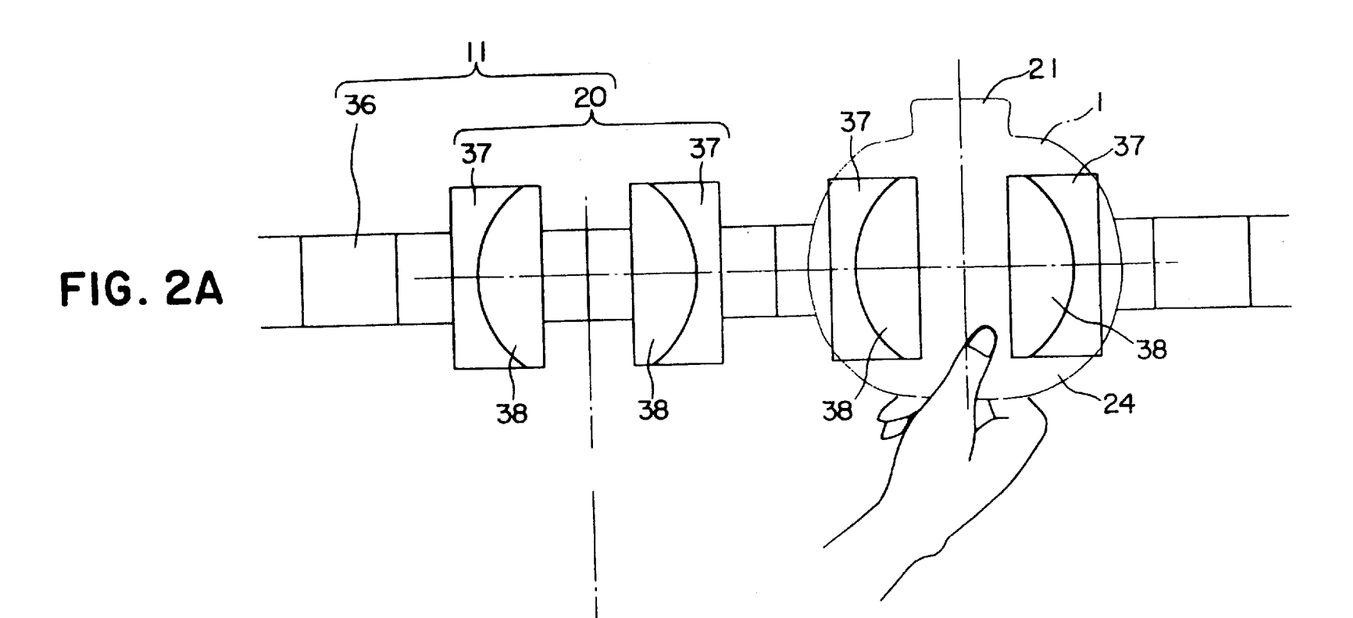
FIG. 2A is a plan view for explaining a condition that a shellfish is rested on a transporting body in the shellfish processing method according to the present invention.
Figure 2B:
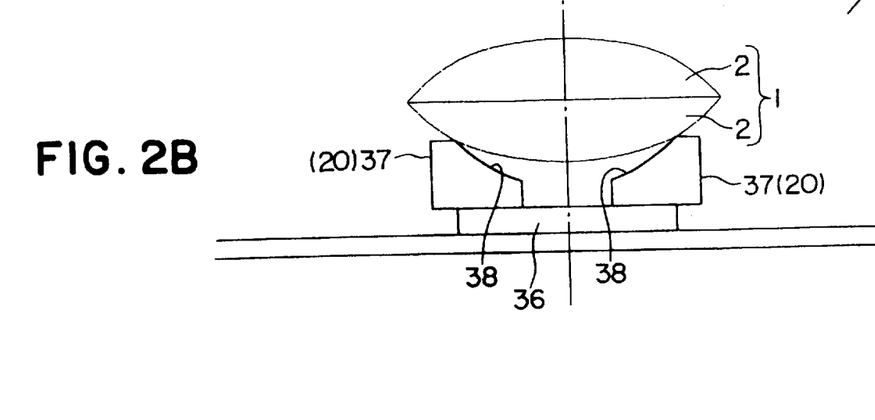
FIG. 2B is a front view schematically showing the condition that the shellfish is rested on the transporting body.
Figure 5:
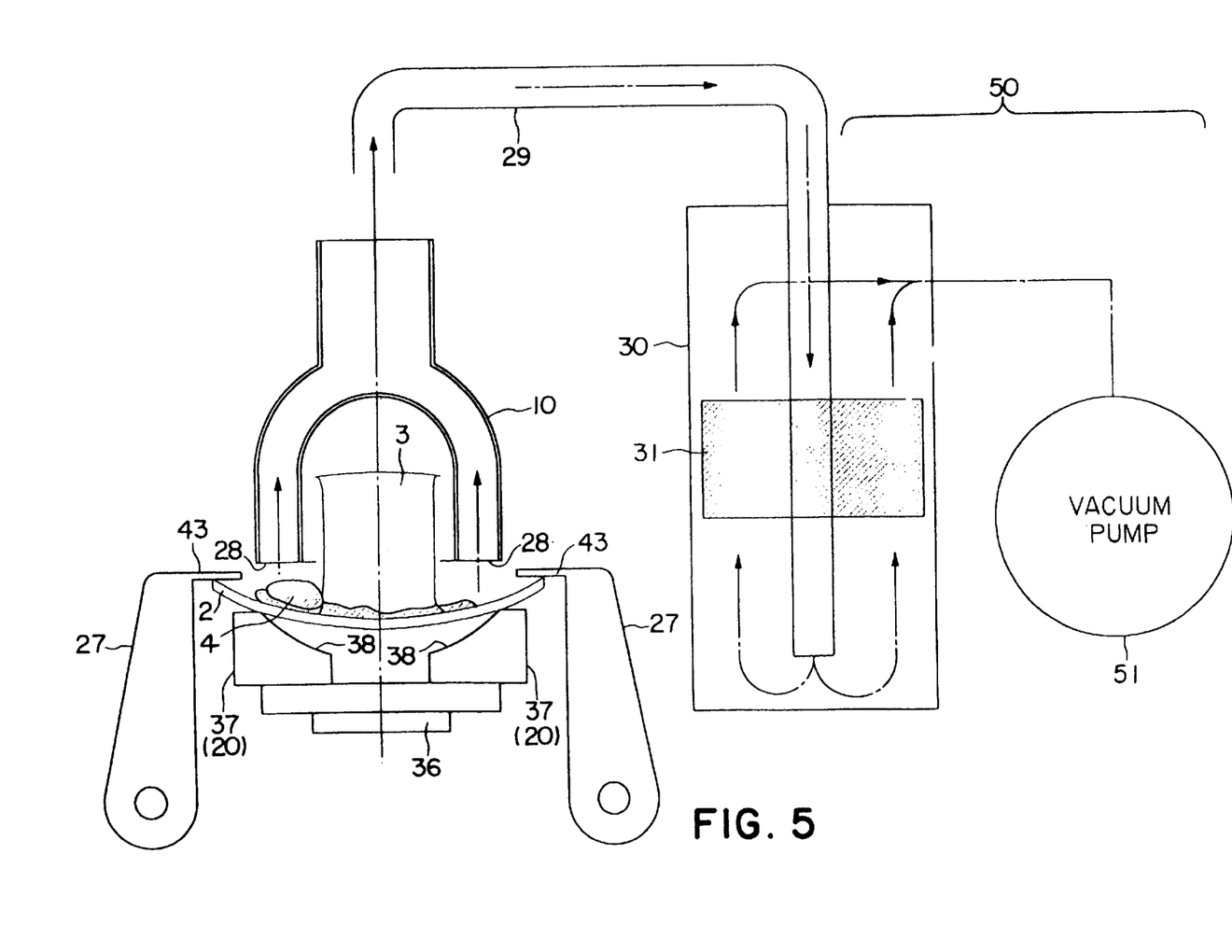
FIG. 5 is an explanatory view showing an associated part removing mechanism used in the shellfish processing method according to the present invention.

During the stoppage, as shown in FIGS. 1D and 5, the lower shell 2 is urged against the receiving tray 20 by means of first holders 27 to be held on the receiving tray 20. In this condition, a suction port 28 of the associated part removing mechanism (suction device) 10 is approached to the lower shell 2 to which the muscle adductor 3 is adhered, and associated parts 4 such as midgut gland, mantle and gonad is removed by suction. The sucked associated parts 4 is introduced into a tank 30 through a discharge path 29, and moisture and fine dust included in the introduced associated parts 4 are passed through a filter 31 within the tank 30 and are discharged outside. If desired, the associated parts 4 accumulated in the tank 30 is sorted into midgut gland, mantle and gonad, and the midgut gland is disposed, and mantle and gonad are post-treated for preparation for foods. When the associated parts 4 is removed from the shells 2, only the midgut gland may be removed and disposed or the remaining associated parts 4 may be removed collectively as goods or the mantle and gill may be removed together. In this way, the associated parts 4 can be removed independently or collectively in part or in total in accordance with the commodity forms.

Figure 6:
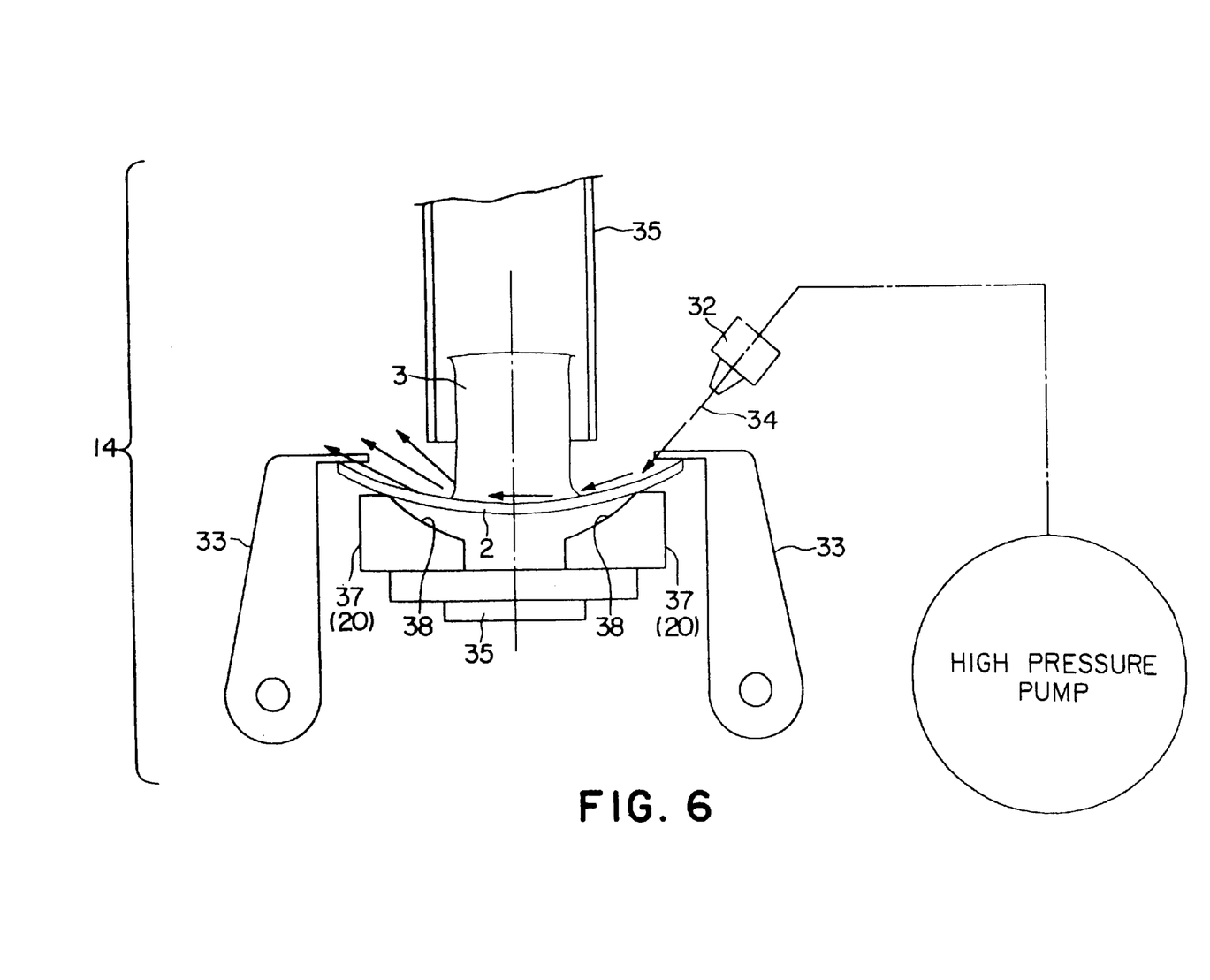
FIG. 6 is an explanatory view showing a second separating mechanism used in the shellfish processing method according to the present invention.

When the suction removal of the associated parts 4 as mentioned above is finished, the transporting body 11 is shifted again. When the shellfish 1 from which the associated parts 4 were removed is transported in the vicinity of a second nozzle 32 shown in FIGS. 1E and 6, the transporting body 11 is stopped again. During the stoppage, the lower shell 2 is urged against the receiving tray 20 by second holders 33 to be held on the receiving tray 20. In this condition, as shown in FIG. 6, liquid 34 injected from the second nozzle 32 with high pressure is directed to the adhesion portion between the muscle adductor 3 and the shell 2 along the inner surface of the lower shell 2, thereby separating the muscle adductor 3 from the shell 2. In this case, as shown in FIG. 6, when a muscle adductor suction device 35 is approached to attract the muscle adductor upwardly, the muscle adductor 3 separated by the liquid can easily be separated from the shell 2.

The muscle adductor 3 separated from the shell 2 is sucked by the muscle adductor suction device 35 and is transported out of the transporting body 11. After the muscle adductor 3 is cleaned by cleaning liquid, it is forwarded to the market as it is or after refrigeration. The cleaning liquid may be water, ozone water or UV-treated water.

Second Embodiment of Shellfish Processing Method

Figures 7A, 7B:
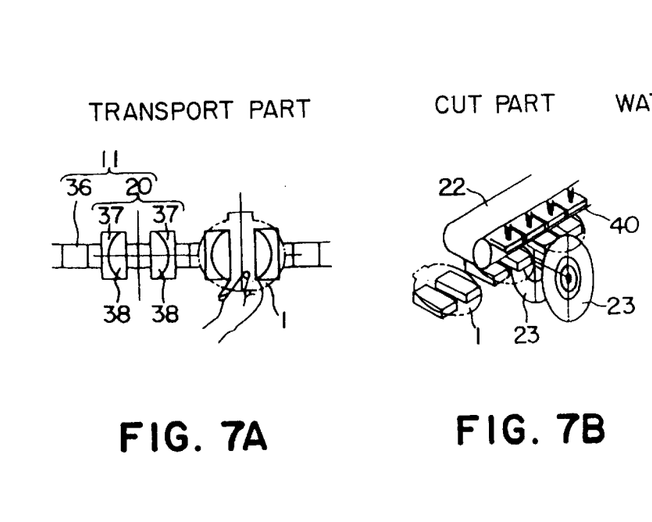
FIGS. 7A to 7G are explanatory views showing steps of a shellfish processing method according to another embodiment of the present invention.
Figures 7C, 7D:
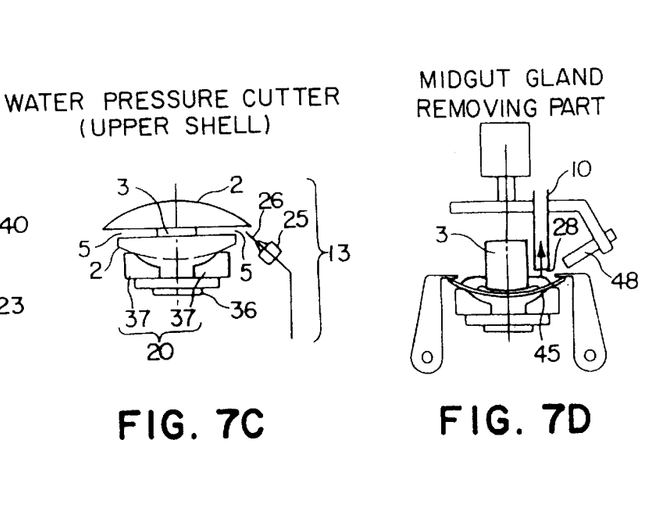
Figure 7E:
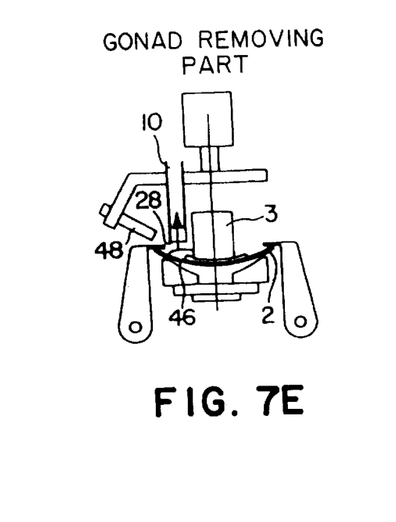
Figure 7F:
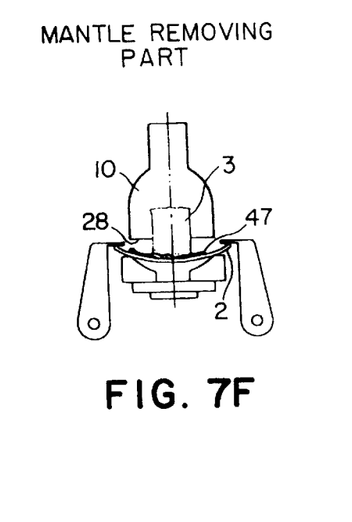
Figure 7G:
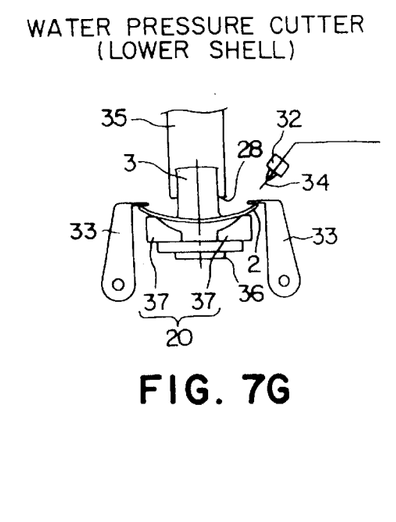

FIGS. 7A to 7G show another embodiment of the shellfish processing method. In this method, the shellfish 1 is transported by the transporting body 11 as shown in FIG. 7A, the shell 2 is cut by the cutting blades 23 to form the opening portions 5 as shown in FIG. 7B, the upper shell 2 is separated from the muscle adductor 3 by water pressure as shown in FIG. 7C, midgut gland 45 is suckingly removed by the suction device (associated part removing mechanism) 10 as shown in FIG. 7D, gonad 46 is suckingly removed by the associated part removing mechanism 10 as shown in FIG. 7E, mantle 47 is suckingly removed as shown in FIG. 7F, and, thereafter, the lower shell 2 is separated from the muscle adductor 3 by water pressure as shown in FIG. 7G. In FIGS. 7D and 7E, for clarify's sake, while the midgut gland 45 and the gonad 46 were shown at positions deviated from each other by 180 degrees, in actual, the midgut gland 45 and the gonad 46 are located at positions deviated from each other by 90 degrees along the circumference of the muscle adductor 3. Thus, in FIGS. 7D and 7E, the suction device (associated part removing mechanism) 10 for suckingly removing the midgut gland 45 is also used as the suction device (associated part removing mechanism) 10 for suckingly removing the gonad 46, and such an associated part removing mechanism 10 can be reciprocally rocked by 90 degrees as shown in FIGS. 7D and 7E, and, further, after the associated part removing mechanism 10 suckingly removes either the midgut gland 45 or the gonad 46, it is automatically rocked by 90 degrees to suckingly remove the other.

The system shown in FIGS. 7A to 7G is provided with a color discriminating sensor 48. This sensor 48 can discriminate a color of the gonad 46 to judge whether the gonad 46 is included in a male shellfish or a female shellfish. Incidentally, the color of the gonad of the male shellfish is white and the color of the gonad of the female shellfish is red. By effecting such judgement, since the gonads 46 can be sorted into male gonad and female gonad, it is convenient.

First Embodiment of Shellfish Processing Device

The transporting body 11 shown in FIG. 1A is constituted, as shown in FIGS. 3A and 3B, by the receiving trays 20 attached to a moving member 36 such as a chain or a belt, and each receiving tray 20 has a pair of receiving pieces 37, and a semicircular concave recess 38 is formed in an upper surface of each receiving piece, and the pair of receiving pieces 37 are attached to the moving member 36 so that the concave recesses 38 are opposed to each other. The transporting body 11 is shifted intermittently by predetermined distances so that, when the transporting body 11 is shifted to the predetermined positions, it is automatically stopped and, when a predetermined time period is elapsed, the transporting body is automatically shifted again.

The holder 22 shown in FIGS. 1B and 3A comprises an endless belt, and pushing members 41 for urging a lower run 40 of the holder 22 downwardly are arranged inside of the belt. The pushing members 41 are disposed in a confronting relationship to the receiving trays 20 with the interposition of the lower run 40 of the holder 22 to pinch the shellfishes 1 on the receiving trays 20 between the lower run and the receiving trays 20. Springs 42 are disposed outside of the holder 22. Each spring 42 serves to urge the pushing member 41 downwardly and is returned upwardly when the shellfish 1 on the receiving tray 20 reaches below the lower run 40 of the holder 22.

The cutter blades 23 shown in FIG. 1B are diamond cutters which are disposed at both ends in the width-wise direction of the transporting body 11 and are rotated by a driving device (not shown). As the cutter blade 23, a cutter made of other material or having other configuration suitable for cutting the shell 2 can be used. The cutter blades 23 may be rotated continuously or may be rotated only during the cutting operation.

The shellfish holding mechanism shown in FIG. 5 comprises two arm-shaped first holders 27 disposed at both sides of the receiving tray 20 so that, when the holders 27 is closed inwardly by a driving device (not shown), locking portions 43 of upper ends of the holders 27 are engaged by an upper edge of the lower shell 2 rested on the receiving tray 20 to urge the shell 2 against the receiving tray 20 to hold the shell on the tray, and, when the holders 27 are opened outwardly by the driving device, the locking portions 43 of the holders 27 are disengaged from the upper edge of the lower shell 2, thereby releasing the urging against the receiving tray 20. Other holding mechanism may be used.

As shown in FIG. 5, as a suction mechanism 50 of the associated part removing mechanism 10, a vacuum suction device is used. The suction mechanism 50 creates vacuum in the discharge path 29 and the associated part removing mechanism (vacuum nozzle) 10 by the action of a vacuum pump 51. The suction port 28 of the associated part removing mechanism 10 is approached to the associated parts 4 adhered to the shell 2 to suck the associated parts 4 and remove it from the shell 2. The associated parts 4 sucked into the associated part removing mechanism 10 is introduced into the tank 30 through the discharge path 29. The moisture and fine dust included in the associated parts 4 introduced in the tank 30 are passed through the filter 31 within the tank 30 and are discharged out of the tank 30. If desired, the associated parts 4 accumulated in the tank 30 is sorted into various parts to be used in various applications or be disposed. The first holders 27 are opened and closed in the left-and-right direction by the driving mechanism (not shown). When the associated parts 4 are removed from the lower shell 2, the first holders 27 are opened, thereby releasing the holding of the shell 2.

While the suction port 28 of the associated part removing mechanism 10 shown in FIG. 5 had a ring shape, the suction port 28 may be a cylindrical shape as the muscle adductor suction device 35 shown in FIG. 6 or may be a small diameter circular hole shape or an elongated hole shape, and, a size of the hole may be selected voluntarily so that the associated parts 4 can be sucked independently or simultaneously collectively.

Second Embodiment of Shellfish Processing Device

In FIG. 1C, while an example that the opening portions 5 are formed in only the lower shell 2 was explained, such opening portions may be formed in both upper and lower shells 2. The opening portions may be located at positions other than the illustrated positions. For example, opening portion(s) may be formed at one end or both ends of the shell 2 in the width-wise direction thereof.

In FIG. 1B, while the rotary cutters 23 having disk shape was illustrated, the cutter blades 23 may have other shapes or may effect other motion (for example, reciprocal motion). For example, cylindrical cutter blades 23 may be rotated to form circular opening portions 5 in the shell 2. Further, in place of the cutter blades, a heavy member such as a hummer may be dropped onto the shell from the above to crush the shell, thereby forming the opening portion. In this case, fragments and powder produced from the shell 2 may be suckingly removed by a suckingly removing device while cutting them or may be washed by liquid (for example, water).

In FIGS. 1A and 1B, while an example that the transporting body 11 is shifted intermittently so that when it is stopped the shell 2 is cut by the cutter blades 23 was explained, the transporting body 11 may be shifted continuously to form the opening portions or to effect other treatment during the shifting movement. In this case, the shifting movement is effected at a speed in which the operation can easily be performed.

In FIG. 1C, while an example that, when the upper shell 2 is separated from the muscle adductor 3, the shellfish 1 on the receiving tray 20 is sucked downwardly by the suction holding mechanism incorporated into the receiving tray 20 to be held on the receiving tray 20 was explained, it is convenient that, when stopped, the holding mechanism is automatically connected to the suction device located at the stop position to start suction and, before re-start, the suction device is automatically disconnected. In the case where the suction holding mechanism is incorporated into the receiving tray 20, when the suction devices are located at the respective stop positions and the suction devices are automatically connected and disconnected with respect to the holding mechanism, if the first holders 27 and the second holders 33 are not used in the respective stop positions, the shellfish on the receiving tray 20 can be sucked to and held on the receiving tray 20. Further, in place of the fact that the suction holding mechanism is incorporated into the receiving tray 20, holders such as the first and second holders 27, 33 may be provided in each process.

In the first embodiment, while an example that after the upper shell 2 is opened the associated parts 4 adhered to the lower shell 2 is suckingly removed was explained, in the present invention, after the opening portions 5 are formed, without opening the upper shell 2, the suction port (for example, nozzle) 28 of the associated part removing mechanism 10 may be approached to the opening portion 5 to suckingly remove the midgut gland 45 alone from the shellfish 1.

In FIG. 1D, while an example that the entire associated parts 4 such as midgut gland, mantle and gonad is simultaneously suckingly removed collectively by the single associated part removing mechanism 10 was explained, the associated parts 4 may be suckingly removed to be sorted into the mantle, gonad and midgut gland. Particularly, since the midgut gland is disposed and a the other parts are used as goods, it is desirable that the midgut gland be suckingly removed independently from the other parts. To this end, a suckingly removing device and a suction mechanism exclusively used for removing the midgut gland may be provided, or suckingly removing devices and suction mechanism such as a mantle suckingly removing device and a gonad suckingly removing device may be provided independently to suckingly remove the associated parts in accordance with the kinds. Since the gonad does not exist through the year but exists only in the breeding season, only when the gonad exists, it is suckingly removed.

Third Embodiment of Shellfish Processing Device

Figure 8:
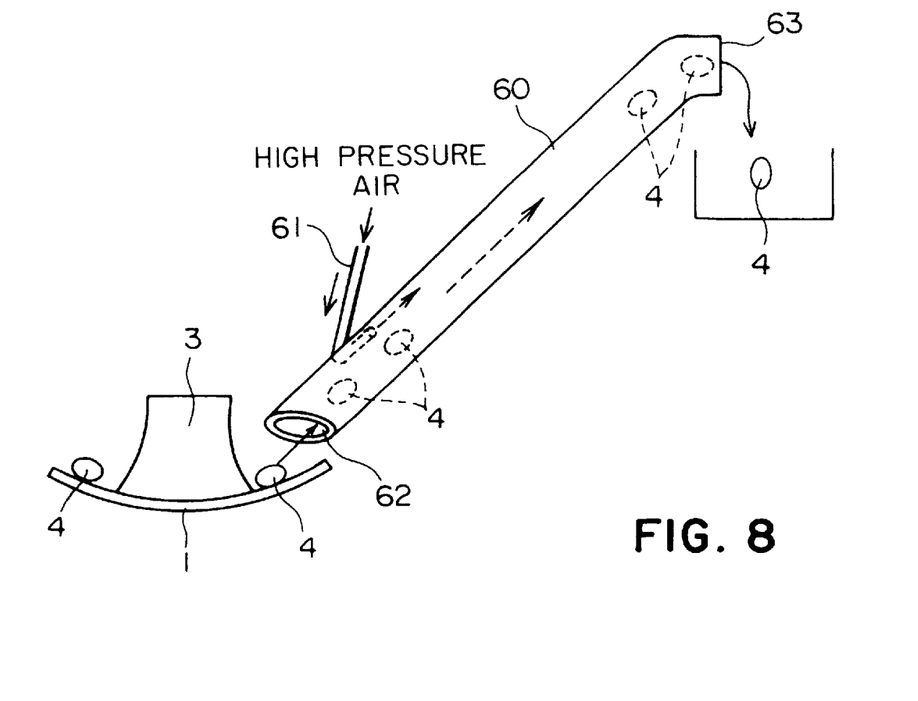
FIG. 8 is a schematic view showing an example of a suction mechanism of high pressure air type of a shellfish processing device according to the present invention.

In the above-mentioned embodiments of the shellfish processing device, as shown in FIG. 5, while an example that the vacuum suction device utilizing the vacuum pump 51 is used as the, suction mechanism 50 of the associated part removing mechanism 10 was explained, other associated part removing mechanism may be used. For example, as shown in FIG. 8, when high pressure air is supplied from a supply pipe 61 to a suction pipe 60 and the high pressure air is shifted at a high speed in the supply pipe 61, negative pressure is generated in the suction pipe 60, with the result that the associated parts 4 can be sucked into a suction port 62 of the suction pipe 60 approached to the associated parts 4 of the shellfish and the associated parts 4 can be discharged from an outlet 63 of the suction pipe 60 through the suction pipe 60. The dimension (fatness, configuration) of the suction pipe 60 and the supply pipe 61 can be selected voluntarily.

Fourth Embodiment of Shellfish Processing Device

Figure 9:
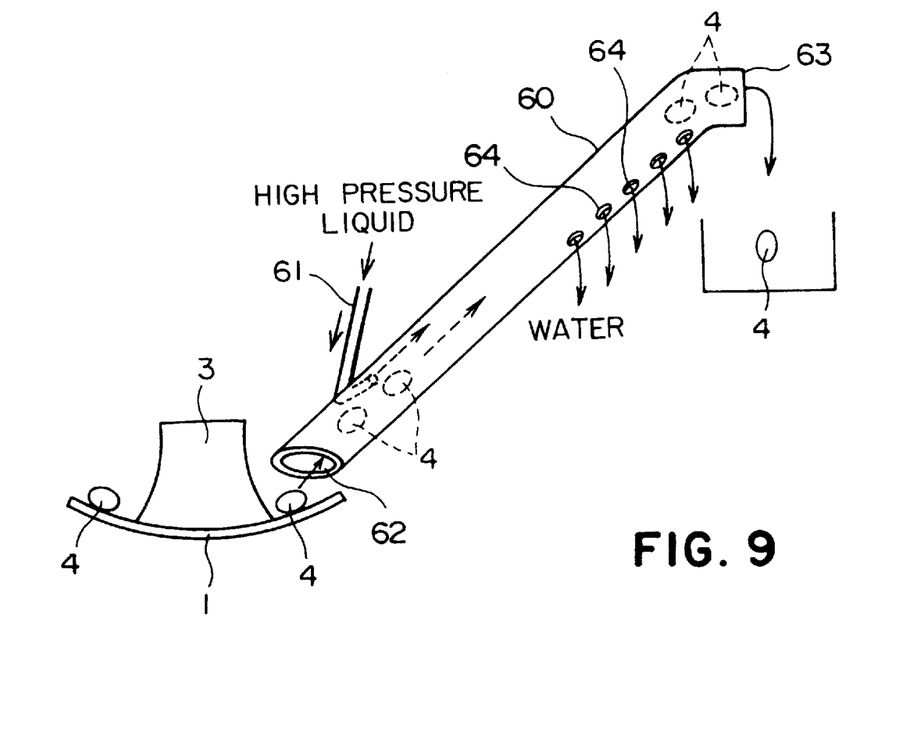
FIG. 9 is a schematic view showing an example of a suction mechanism of high hydraulic pressure type of a shellfish processing device according to the present invention.

As shown in FIG. 9, when high pressure liquid (water or other liquid) is supplied from a supply pipe 61 to a suction pipe 60 and the high pressure liquid is shifted at a high speed in the supply pipe 61, negative pressure is generated in the suction pipe 60, with the result that the associated parts 4 can be sucked into a suction port 62 of the suction pipe 60 approached to the associated parts 4 of the shellfish and the associated parts 4 can be discharged from an outlet 63 of the suction pipe 60 through the suction pipe 60. In this case, it is desirable that small holes 64 are formed in the suction pipe 60 in the vicinity of the outlet 63 so that the liquid shifted at the high speed through the suction pipe 60 is discharged from the small holes 64 and the associated parts 4 are mainly discharged from the outlet 63 of the suction pipe 60. The dimension (fatness, configuration) of the suction pipe 60 and the supply pipe 61 can be selected voluntarily.

Industrial Availability

The shellfish processing method according to the present invention provides the following effects:
1. Since the muscle adductor is separated from the shells by using the liquid, the muscle adductor is hard to be damaged.
2. Since the muscle adductor is not heated at all, the raw muscle adductor can be taken out without deteriorating the quality and the muscle adductor can be sold as raw goods in the market.
3. Even if the shell fragments, scraps and powder are adhered to the muscle adductor during the opening of the shell, since such foreign matters are washed out by the liquid, the muscle adductor without any foreign matter can be taken out.
4. Since the associated parts are suckingly removed, the associated parts can be removed easily and positively. Further, since the associated parts are not damaged, commerce value of the associated parts are not decreased.
5. Since the shells are separated by the liquid and the associated parts are suckingly removed by the suction device, after the shellfish is rested on the transporting body, the muscle adductor and the associated parts are not contacted with the operator's finger. This is very sanitary.

In the shellfish processing device according to the present invention, since there are provided the transporting body for transporting the shellfish, the opening mechanism for forming the opening portions in the shell, the suckingly removing device for suckingly removing the associated parts from the shells and the separating mechanism for separating the muscle adductor from the shells by the injection of the liquid, formation of the opening portions, removal of the associated parts and removal of the muscle adductor can be effected automatically, thereby reducing the power consumption and cost greatly.

What is claimed is:
1. A shellfish processing method comprising the steps of:
   transporting a shellfish by a transporting body; and
   injecting liquid from a nozzle into an inside of a first shell of first and second shells of the shellfish to separate the first shell from meat, including a muscle adductor, thereby opening the first shell.
2. The shellfish processing method according to claim 1, wherein the transporting of the shellfish to be transported by the transporting body is accomplished while the shellfish is sandwiched between the transporting body and a holder running in synchronism with the transporting body.
3. The shellfish processing method according to claim 1, wherein the injecting of the liquid from the nozzle into the inside of the first shell of the first and second shells of the shellfish to separate the first shell from the meat, including the muscle adductor, thereby opening the first shell further comprises swinging the nozzle or rotating the nozzle in an outer peripheral direction of the muscle adductor to jet the liquid injected from the nozzle to an attachment portion between the muscle adductor and the first shell along an inner peripheral surface of the first shell from various directions, thereby separating the muscle adductor from the first shell.
4. A shellfish processing method comprising the steps of:
   forming an opening portion by an opening mechanism in a part of at least a first shell of first and second shells of a shellfish transported by a transporting body;
   transporting the shellfish by the transporting body to another location; and
   injecting liquid from a nozzle into an inside of the first shell of the first and second shells through the opening portion to separate the first shell from meat, thereby opening the first shell.
5. The shellfish processing method according to claim 4, wherein the transporting of the shellfish to be transported by the transporting body to another location is accomplished while the shellfish is sandwiched between the transporting body and a holder running in synchronism with the transporting body.
6. The shellfish processing method according to claim 4, wherein the injecting of the liquid from the nozzle into the inside of the first shell of the first and second shells through the opening portion to separate the first shell from the meat, thereby opening the first shell further comprises swinging the nozzle or rotating the nozzle in an outer peripheral direction of the muscle adductor to jet the liquid injected from the nozzle to an attachment portion between the muscle adductor and the first shell along an inner peripheral surface of the first shell from various directions, thereby separating the muscle adductor from the first shell.
7. The shellfish processing method according to claim 4, wherein the forming of the opening portion by the opening mechanism in the part of the first shell of the first and second shells of the shellfish transported by the transporting body further comprises removing fragments and powder of the first shell when the opening portion is formed by the opening mechanism in the first shell by suction using a suction removing device or by liquid washing.
8. The shellfish processing method according to claim 4, wherein the forming of the opening portion by the opening mechanism in the part of the first shell of the first and second shells of the shellfish transported by the transporting body is accomplished by at least one of:
   removing the part of the first shell by a cutting operation;
   perforating the part of the first shell; and
   breaking the part of the first shell by pressurization.
9. The shellfish processing method according to claim 8, wherein the forming of the opening portion by the opening mechanism in the part of at least the first shell of the first and second shells of the shellfish transported by the transporting body includes removing fragments and powder of the first shell produced when the opening portion is formed by the opening mechanism in the first shell by suction using a suction removing device or by liquid washing.

10. A shellfish processing method comprising the steps of:
injecting liquid from a nozzle into an inside of a first shell of first and second shells of a shellfish transported by a transporting body to separate the first shell from meat, thereby opening the first shell;
transporting the shellfish by a transporting body to another location to be held by a holder; and
suckingly removing, in a held state of the shellfish, associated parts, selected from a group consisting of midgut gland, gonad, mantle, heart, gill and tentacle of the shellfish, attached to the second shell by an associated part removing mechanism independently or collectively in part or in total.

11. The shellfish processing method according to claim 10, wherein the transporting of the shellfish to be transported by the transporting body to another location to be held by the holder is accomplished while the shellfish is sandwiched between the transporting body and a holder running in synchronism with the transporting body.

12. The shellfish processing method according to claim 10, wherein the injecting of the liquid from the nozzle into the inside of the first shell of the first and second shells of the shellfish transported by the transporting body to separate the first shell from the meat, thereby opening the first shell further comprises swinging the nozzle or rotating the nozzle in an outer peripheral direction of the muscle adductor to jet the liquid injected from the nozzle to an attachment portion between the muscle adductor and the first shell along an inner peripheral surface of the first shell from various directions, thereby separating the muscle adductor from the first shell.

13. A shellfish processing method comprising the steps of:
forming an opening portion by an opening mechanism in a part of at least a first shell of first and second shells of a shellfish transported by a transporting body;
transporting the shellfish by a transporting body to another location to be held by a holder; and
suckingly removing, in a held state of the shellfish, associated parts, selected from a group consisting of midgut gland, gonad, mantle, heart, gill and tentacle of the shellfish, attached to the second shell by an associated part removing mechanism independently or collectively in part or in total.

14. The shellfish processing method according to claim 13, wherein the transporting of the shellfish to be transported by the transporting body to another location to be held by the holder is accomplished while the shellfish is sandwiched between the transporting body and the holder running in synchronism with the transporting body.

15. The shellfish processing method according to claim 13, further comprisng:
after the transporting of the shellfish by the transporting body to another location to be held by the holder, injecting liquid from a nozzle into an inside of the first shell of the first and second shells of the shellfish transported by the transporting body to separate the first shell from meat, including a muscle adductor, thereby opening the first shell; and
jetting the liquid injected from the nozzle to an attachment portion between the muscle adductor and the second shell along an inner peripheral surface of the second shell, thereby separating the muscle adductor from the second shell.

16. The shellfish processing method according to claim 13, wherein the forming of the opening portion by the opening mechanism in the part of the first shell of the first and second shells of the shellfish transported by the transporting body further comprises removing fragments and powder of the first shell produced when the opening portion is formed by the opening mechanism in the first shell by suction using a suction removing device or by liquid washing.

17. The shellfish processing method according to claim 13, wherein the forming of the opening portion by the opening mechanism in the part of the first shell of the first and second shells of the shellfish transported by the transporting body is accomplished by at least one of:
removing the part of the first shell by a cutting operation;
perforating the part of the first shell; and
breaking the part of the first shell by pressurization.

18. The shellfish processing method according to claim 17, wherein the forming of the opening portion by the opening mechanism in the part of the first shell of the first and second shells of the shellfish transported by the transporting body further comprises removing fragments and powder of the first shell produced when the opening portion is formed by the opening mechanism in the first shell by suction using a suction removing device or by liquid washing.

19. A shellfish processing method comprising the steps of:
forming an opening portion by an opening mechanism in a part of a first shell of first and second shells of a shellfish transported by a transporting body;
transporting the shellfish by the transporting body; and
suckingly removing associated parts, selected from a group consisting of midgut gland, gonad, mantle, heart, gill and tentacle of the shellfish, attached to the second shell through the opening portion by an associated part removing mechanism independently or collectively in part or in total.

20. The shellfish processing method according to claim 19, wherein the transporting of the shellfish by the transporting body is accomplished while the shellfish is sandwiched between the transporting body and a holder running in synchronism with the transporting body.

21. The shellfish processing method according to claim 19, further comprising:
after the transporting of the shellfish by the transporting body, injecting liquid from a nozzle into an inside of the first shell of the first and second shells of the shellfish transported by the transporting body to separate the first shell from meat, including a muscle adductor, thereby opening the first shell; and
jetting the liquid injected from the nozzle to an attachment portion between the muscle adductor and the second shell along an inner peripheral surface of the second shell, thereby separating the muscle adductor from the second shell.

22. The shellfish processing method according to claim 19, wherein the forming of the opening portion by the opening mechanism in the part of the first shell of the first and second shells of the shellfish transported by the transporting body further comprises removing fragments and powder of the first shell produced when the opening portion is formed by the opening mechanism in the first shell by suction using a suction removing device or by liquid washing.

23. The shellfish processing method according to claim 19, wherein the forming of the opening portion by the opening mechanism in the part of the first shell of the first and second shells of the shellfish transported by the transporting body further comprises forming the opening portion in the part of the first shell of the first and second shells of the shellfish by at least one of:

removing the part of the first shell by a cutting operation;

perforating the part of the first shell; and breaking the part of the first shell by pressurization.

24. The shellfish processing method according to claim 23, wherein the forming of the opening portion by the opening mechanism in the part of the first shell of the first and second shells of the shellfish transported by the transporting body further comprises removing fragments and powder of the first shell produced when the opening portion is formed by the opening mechanism in the first shell by suction using a suction removing device or by liquid washing.

25. A shellfish processing device comprising:

a transporting body for transporting a shellfish;

a nozzle for injecting liquid into an inside of a first shell of first and second shells of the shellfish to separate the first shell from meat, including the muscle adductor, thereby opening the first shell;

a holder for holding the shellfish; and an associated part removing mechanism for suckingly removing associated parts, selected from a group consisting of midgut gland, gonad, mantle, heart, gill, and tentacle of the shellfish, attached to the second shell in a held state of the shellfish, independently or collectively in part or in total.

26. The shellfish processing device according to claim 25, wherein the holder runs in synchronism with the transporting body and holds the shellfish transported by the transporting body while sandwiching the shellfish between the holder and the transporting body.

27. The shellfish processing device according to claim 25, further comprising a color determination sensor for determining a color of the gonad of the shellfish.

28. A shellfish processing device comprising:

a transporting body for transporting a shellfish;

a first nozzle for injecting liquid into an inside of a first shell of first and second shells of the shellfish to separate the first shell from meat, including a muscle adductor, thereby opening the first shell;

a holder for holding the shellfish;

an associated part removing mechanism for suckingly removing associated parts, selected from a group consisting of midgut gland, gonad, mantle, heart, gill, and tentacle of the shellfish, attached to the second shell in a held state of the shellfish, independently or collectively in part or in total; and a second nozzle for injecting liquid into an inside of the second shell where the associated parts have been removed, to separate the meat, including the adductor muscle, from the second shell.

29. The shellfish processing device according to claim 28, wherein the holder runs in synchronism with the transporting body and holds the shellfish transported by the transporting body while sandwiching the shellfish between the holder and the transporting body.

30. The shellfish processing device according to claim 28, further comprising a color determination sensor for determining a color of the gonad of the shellfish.

31. A shellfish processing device comprising:

a transporting body for transporting a shellfish;

an opening mechanism for forming an opening portion in a part of at least a first shell of first and second shells of the shellfish;

an injection nozzle for injecting liquid into an inside of the first shell of the first and second shells through the opening portion to separate the first shell from meat, including an adductor muscle, thereby opening the first shell;

a holder for holding the shellfish;

an associated part removing mechanism for suckingly removing associated parts, selected from a group consisting of midgut gland, gonad, mantle, heart, gill, and tentacle of the shellfish, attached to the second shell, in a held state of the shellfish, independently or collectively in part or in total.

32. The shellfish processing device according to claim 31, further comprising: a suction removing device for suckingly removing fragments and powder of the first shell produced when the opening portion is formed in the first shell, or a washing device for removing fragments and powder of the first shell produced when the opening portion is formed in the first shell by liquid washing.

33. The shellfish processing device according to claim 31, wherein the holder runs in synchronism with the transporting body and holds the shellfish transported by the transporting body while sandwiching the shellfish between the holder and the transporting body.

34. The shellfish processing device according to claim 31, further comprising a color determination sensor for determining a color of the gonad of the shellfish.

35. A shellfish processing device comprising:

a transporting body for transporting a shellfish;

an opening mechanism for forming an opening portion in a part of at least a first shell of first and second shells of the shellfish; and a first injection nozzle for injecting liquid into an inside of the first shell of the first and second shells through the opening portion to separate the first shell from meat, including the adductor muscle, thereby opening the first shell;

a holder for holding the shellfish;

an associated part removing mechanism for suckingly removing associated parts, selected from a group consisting of midgut gland, gonad, mantle, heart, gill, and tentacle of the shellfish, attached to the second shell, in a held state of the shellfish, independently or collectively in part or in total;

a second injection nozzle for injecting liquid into an inside of the second shell where the associated parts have been removed, to separate the second shell from meat, including the adductor muscle.

36. The shellfish processing device according to claim 35, further comprising: a suction removing device for suckingly removing fragments and powder of the first shell produced when the opening portion is formed in the first shell, or a washing device for removing fragments and powder of the first shell, produced when the opening portion is formed in the first shell, by liquid washing.

37. The shellfish processing device according to claim 35, wherein the holder runs in synchronism with the transporting body and holds the shellfish transported by the transporting body while sandwiching the shellfish between the holder and the transporting body.

38. The shellfish processing device according to claim 35, further comprising a color determination sensor for determining a color of the gonad of the shellfish.

39. A shellfish processing device comprising:

a transporting body for transporting a shellfish;

an opening mechanism for forming an opening portion in a part of at least the first shell of first and second shells of the shellfish; and an associated part removing mechanism for suckingly removing associated parts, selected from a group consisting of midgut gland, gonad, mantle, heart, gill, and tentacle of the shellfish, attached to the second shell independently or collectively in part or in total through the opening portion.

40. The shellfish processing device according to claim 39, further comprising: a suction removing device for suckingly removing fragments and powder of the first shell produced when the opening portion is formed in the first shell, or a washing device for removing fragments and powder of the first shell, produced when the opening portion is formed in the first shell, by liquid washing.

41. The shellfish processing device according to claim 39, further comprising a holder running in synchronism with the transporting body and holding the shellfish transported by the transporting body while sandwiching the shellfish between itself and the transporting body.

42. A shellfish processing device according to claim 39, further comprising a color determination sensor for determining a color of the gonad of the shellfish.

* * * * *